No. 897,659. PATENTED SEPT. 1, 1908.
R. REIN.
CALCULATING MACHINE.
APPLICATION FILED OCT. 23, 1906.
3 SHEETS—SHEET 2.
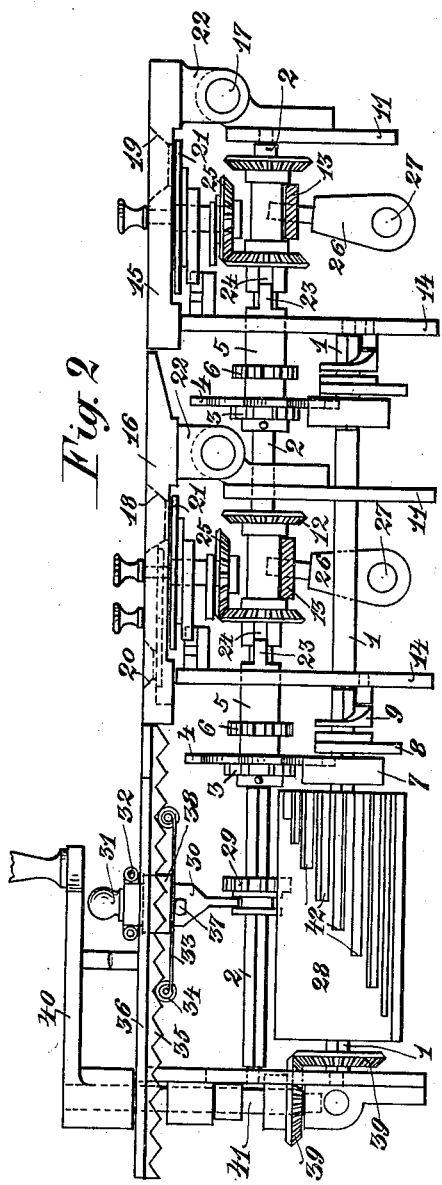
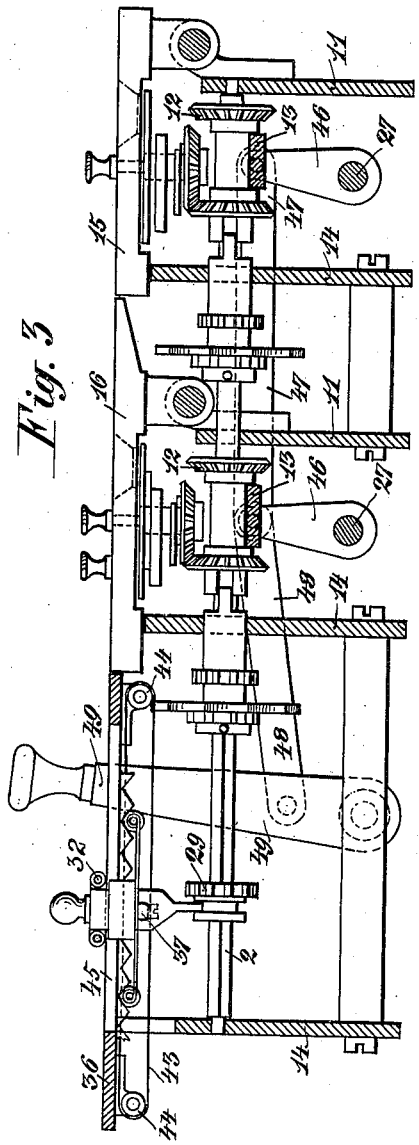
Witnesses.
Inventor.

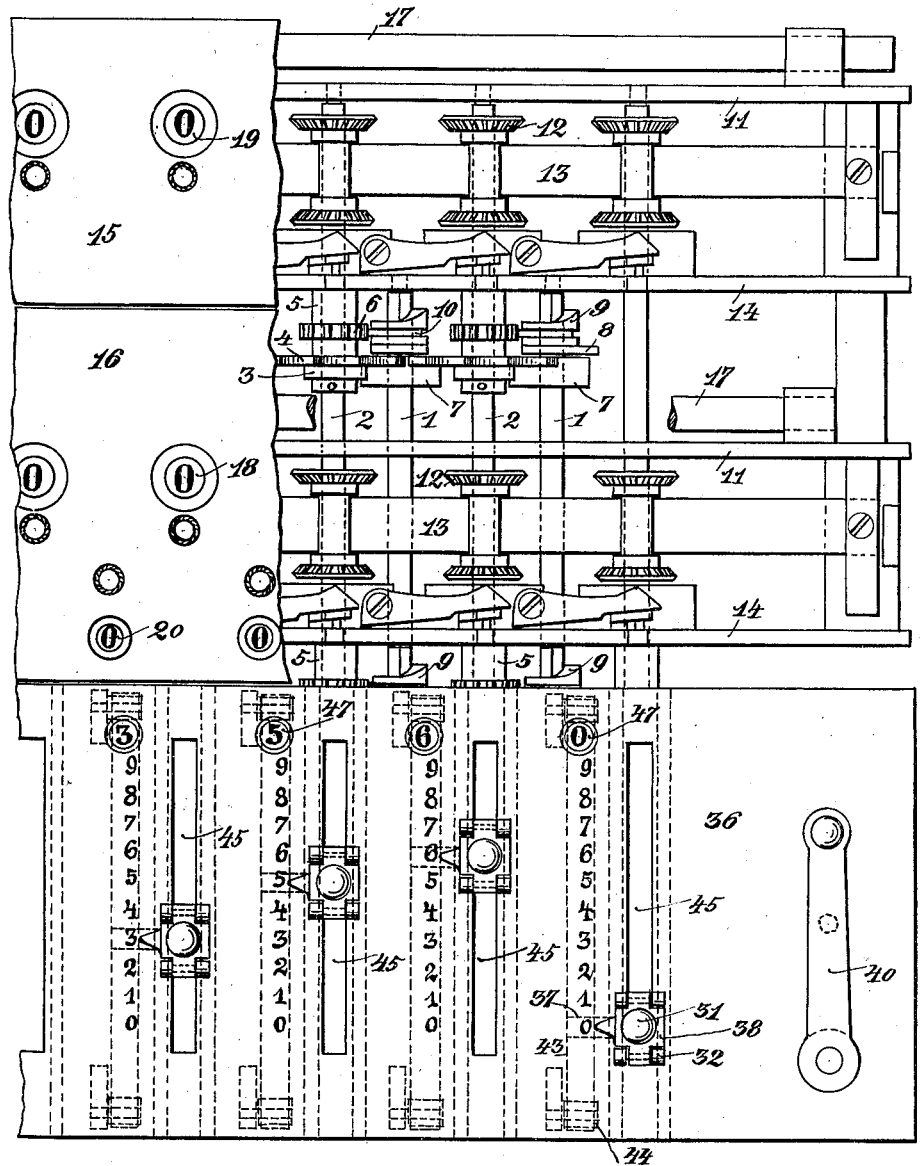

No. 897,659. PATENTED SEPT. 1, 1908.
R. REIN.
CALCULATING MACHINE.
APPLICATION FILED OCT. 23, 1906.

3 SHEETS—SHEET 3.

Witnesses.

Inventor.
Robert Rein

UNITED STATES PATENT OFFICE.

ROBERT REIN, OF SCHLACHTENSEE, NEAR BERLIN, GERMANY, ASSIGNOR, BY MESNE ASSIGNMENTS, TO LUDWIG SPITZ & CO., G. M. B. H., OF BERLIN, GERMANY, A CORPORATION.

CALCULATING-MACHINE.

No. 897,659.   Specification of Letters Patent.   Patented Sept. 1, 1908.

Application filed October 23, 1906. Serial No. 340,208.

*To all whom it may concern:*

Be it known that I, ROBERT REIN, engineer, a citizen of the Kingdom of Prussia, Germany, and residing at 3 Kurstrasse, Schlachtensee, near Berlin, Germany, have invented new and useful Improvements in Calculating-Machines of the Thomas Type, of which the following is a specification.

The present invention refers to certain improvements in calculating machines of the type shown in Thomas de Colmar's British patent No. 13504 of 1851, and has for its object to permit the results of two calculations to become visible at the same time, whereas in machines of the type above referred to only one calculation could be read at a time, and to improve certain details of construction in machines of this type.

Figure 4:
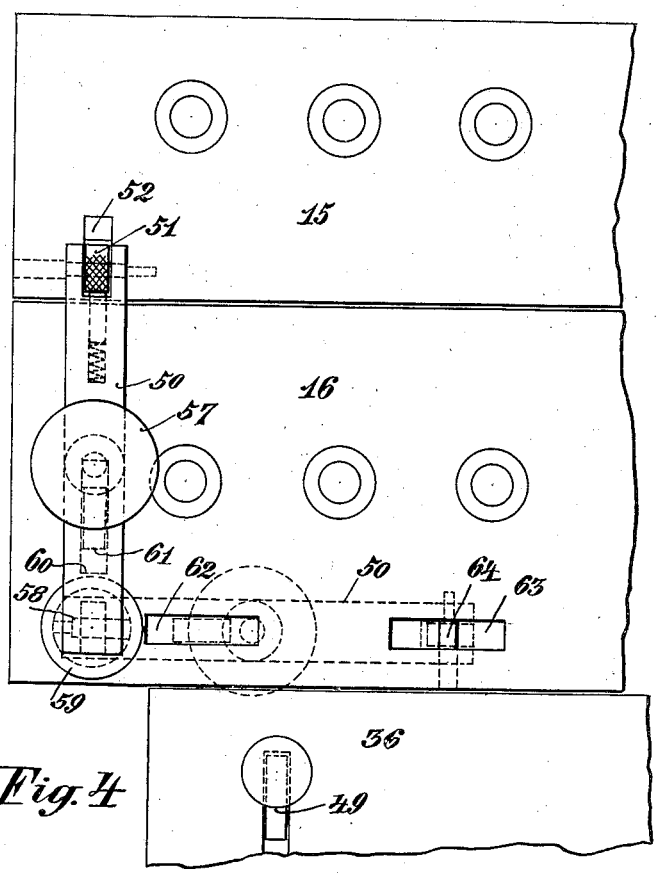
Figure 5:
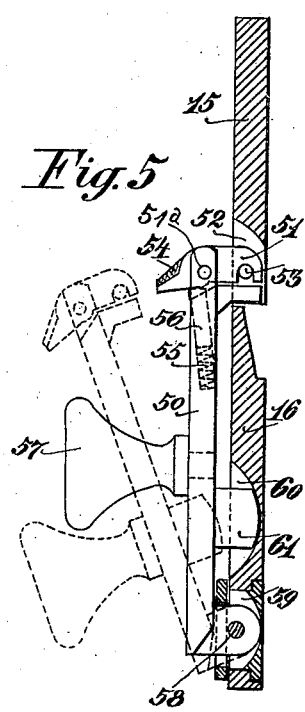
Figure 6:
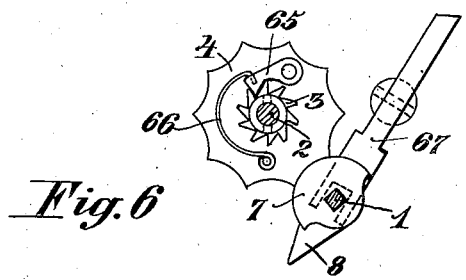

The calculating machine embodying the present invention is exemplified in the accompanying drawings in which;

Figure 1 is a part plan of the calculating machine. Fig. 2 is a side view. Fig. 3 is a vertical section through the calculating machine. Fig. 4 illustrates the connection of the two index plates seen from above. Fig. 5 is a vertical section through Fig. 4. Fig. 6 is a detailed view of the locking gear.

As shown, the feed drums 28 having nine graduated teeth 42 are arranged in the same manner as in the calculating machine shown in the patent above referred to, and are driven by means of bevel gears 39, 39 and the shaft 41 by the crank handle 40 arranged over the setting plate 36. The feed drums 28 are carried by shafts 1, which are made of prismatic section where they carry the various parts on them, but are otherwise of a round section and turn in bearings in the vertical plates 11 and 14. In the same manner the shafts 2 are of round section and of prismatic section only at such portions where they carry the adjustable gear-wheel 29 adapted to mesh with the drum 28. The remaining portions of the shafts 2 are round and carry the loosely revolving sleeves 5, 5 and the loose, rotary and adjustable bevel gears 12, 12 for the reversing gear.

The sleeves 5, 5 on which are fitted the star shaped ratchet disks 4 and the tens-feed wheels 6, have each at one end one or several lugs or projections 23 engaging notches 24 in the hubs of the bevel gears 12. The bevel gears 12 are thereby carried round when the sleeves 5 are rotated, but for reversing they can be moved axially out of the way. Each of the pairs of bevel gears 12 forms with each third bevel gear 25 on the spindle of the figure disks 21 the reversing gear for the counters. For simultaneously reversing all reversing gears either for addition and multiplication or for subtraction and division, the reversing lever 49 (Fig. 3) is hinged by means of connecting links 47, 48, to the two bars 13 extending across the whole width of the machines and fitted exactly between the hubs of each pair of bevel gears 12. On the bars 13 being moved, the bevel gears 12 will also be axially adjusted on the shafts 2, so that one or the other one of the bevel gears 12 engages with the third bevel gear 25 and accordingly produces a rotary movement of the dials 21 connected with the bevel gears 25 to the right or left respectively.

The dials 21 for the product figures are arranged according to the present invention in two parallel rows on two index plates 15, 16, each row of dials being fitted to a separate index plate. The index plate 16 nearest to the setting plate 36 is made the same way as in the calculating machine of the type above referred to; *i. e.*, with one row of dials and corresponding windows 18 for the one product counter and a second row of dials with windows 20 for the so-called quotient counter. The second index plate 15 however has only one row of dials 21 and the necessary row of windows 19 for the second product counter. The under sides of the index plates 15, 16, are provided with lugs 22, 22, to allow of their being moved on rods 17, 17.

The two index plates 15 and 16 can be quickly coupled together and separated, accordingly as both or only one of the index plates is to be used in the calculation. The arrangement for coupling the index plates consists of a lever 50 provided with a handle 57, said lever being hinged at one end to the index plate 16, and being movable from one position to another at right angles thereto. For this purpose a sleeve 59 with a cross pin 58 is fitted in said index plate 16 revoluble in the plane of said plate, to which pin 58 the one end of lever 50 is pivotally attached. The lever 50 extends with its free end over the edge of the index plate 15 and carries a hook 51 revoluble around the pin 51$^a$, said hook 51 (when the lever 50 is in a position parallel with the plate) engaging with its hooked end behind a pin or projection 53 in a recess 52 and being held in such position by a spring 55 pressing against the other end 54 of the hook, a pin 56 being desirably arranged between the spring and the hook. The lever 50 has, underneath, a lug 61 which exactly fits in a corresponding notch 60 in the index plate 16. If only one index plate is to be used in calculation, the coupling of the two index plates is disconnected by disengaging the hook by pressing a finger against the end 54 and raising up the lever 50 by the handle 57, as shown by the dotted lines in Fig. 5. In such raised position the lever 50 is turned around a right angle to the right and thereupon lowered again, until the hook 51 catches, behind the pin 64 in a recess 63, the lug 61 on the lower side of the lever entering a recess 62. In both instances if one or both plates is to be used for calculation, the handle 57 of the coupling lever 50 always serves to raise or lower it with one hand or to move the index plates, while the other hand holds the crank-handle.

By disconnecting the coupling of the two index plates, the index plate 15 is put out of gear and calculations may be made with the plate 16 alone, as is the case with the calculating machine of the type above referred to.

As there are two counters in the present calculating machine, in which the single tens can be operated at different times, on each of the ratchet disks 4 (Fig. 6) a pawl 65 is provided, which is held by a spring 66 in engagement with a ten-toothed ratchet-wheel 3 on the shaft 2. On the shafts 2 turning to the right, the above described ratchet gears will cause the two ratchet disks 4 on each of shafts 2 and their sleeves 5 to be turned, which will thereby operate the pairs of gears 12 of the reversing gears. When a ten is moved in either of the two product counters, the corresponding tens-finger 8, moved in known manner by means of a tens-feed lever 67 into the range of its tens-feed wheel 6, can advance the tens-feed wheel by one tooth without turning the shaft 2, the second tens-feed wheel 6 of the other counter, arranged on the same shaft 2, remaining stationary if no ten is to be moved. When the respective tens-finger 8 has advanced the tens-feed wheel 6 by one tooth, the tens-finger 8 will, owing to the action of the helical cam 9, be again moved from the range of the respective tens-feed wheel back into its original position, until a new ten is to be advanced.

As in the present calculating machine there are two rows of windows for the product numerals and one row of smaller windows for the quotient numerals in the respective index plates, it is desirable to be able to conveniently and plainly read also the numerals set on the setting plate 36 by means of the single setting slides. For this purpose each setting slide 38 adjustable in a slot 45 of the setting plate 36 is connected by means of a cross-pin 37 with an endless thin metal band 43 (Figs. 1 and 3) which runs over rolls 44 and carries the numerals from 0 to 9 on the upper surface facing the setting plate.

Over each band a window 47 is provided in the setting plate, said windows 47 being arranged in one row, so that the numerals can be conveniently and plainly read through the said row of windows. In Fig. 1 the setting up of the numerals 3560 is illustrated, said numerals being read through the windows 47. When all setting slides are set at zero a zero appears behind each of the windows 47.

The setting slides 38 engage with an arm 30 in the hub of each one-feed-gear wheel 29 so that on the setting slides being adjusted, the said feed gears will be also adjusted on the prismatic portions of the shafts 2 and be made to engage with the teeth 42 of the drums 28.

Each setting slide 38 (Fig. 2) is provided with a spring or an elastic plate 33, which has at its end small rollers 34, which are forced into triangular shaped notches 35 on the under side of the plate 36 arranged in two rows parallel to the slots 45. The pitch of the teeth corresponds with the pitch in which the single figures are marked on the top of the setting plate. On adjusting the setting slides 38 the rollers 34 catch into the respective notches 35, the rollers already commencing to catch, as soon as they have passed the highest point between two notches. In this way it is practically impossible for the setting slides to take up any position other than with their rollers 34 exactly centrally disposed in the notches engaged thereby.

For reducing the friction caused by moving the slides, each of the setting slides 38 may be provided at its upper portion with small rollers 32 or balls, which slide on both sides of the slot 45 on the top surface of the setting plate 36, so that the setting slide may be seized by the knobs 31 and easily adjusted.

The operation and action of the calculating machine according to the present invention is as follows:—As examples I shall carry out the following calculation with simultaneously multiplication and addition:

$$3560 \times 16 \div 364 \times 14896 \times 32 = X.$$

Firstly by means of the setting slides 38 the first factor 3560 is set up on the setting plate. The index plates 15 and 16 are placed in normal position, that is the first window on the right of the two product counters is in line with the first position on the right on the setting plate. The knob of the reversing lever 49 is placed in the position for multiplication. Now the crank handle 40 is turned six times and the index plates are moved by one position to the right: The crank handle is then turned once so that the numerals 3560 have been multiplied with 16. On completion of the multiplication the product counter of each of the two will show the numerals of the product, in the present instance the numerals 56960. Now the two index plates are lifted and both the product and the quotient counters of the plate 16 are set to zero by means of the zero-adjustment, while in the other plate the figures of the product remain. Then the two index plates are restored to their original position and the factor 364 set up on the setting plate. Afterwards I multiply with 14, whereupon the product 5096 of the multiplication becomes visible in the product counter of the index plate 16 and in the product counter of the plate 15 the total 62056 obtained by addition of the former and the last obtained product is read. Now the calculation is continued in the above described manner, by setting the numerals of the plate 16 again to zero and turning down the index plates whereupon the factor 893 of the third multiplication is set up on the setting plate and multiplied with 32. Then in the index plate 16 will be seen as the product of the last multiplication the numerals 28576 and in the plate 15 as the total of all single products obtained the numerals 90632. It is thereby made possible to read and note down the products of the separate multiplications.

If the index plate 16 alone is to be used for calculation, the coupling of the two index plates is disconnected by disengaging the lever 50 and the plate 15 is moved out of gear by turning it up, in which position it may be held by a catch or hook until again required.

Having now described my invention what I claim and desire to secure by Letters Patent of the United States is:—

1. In a machine of the character described, the combination with a pair of index plates, one of said index plates provided with a row of windows for indicating products and the other of said plates provided with two rows of windows for indicating both products and quotients, of means for coupling said index plates, said means including a lever pivoted to one of said plates, and a catch carried by said lever and adapted to engage the other of said plates.

2. In a machine of the character described, the combination with a pair of index plates, one of said index plates provided with a row of windows for indicating products and the other of said plates provided with two rows of windows for indicating both products and quotients, of means for coupling said index plates, (said means including a lever pivoted to one of said plates, a catch carried by said lever and adapted to engage the other of said plates, and a plurality of shafts each having a prismatic portion, a feed-wheel adjustably mounted on the prismatic portion of each of said shafts, sleeves rotatably mounted on said shaft, and a feed-wheel and ratchet-disk rigidly mounted on each of said sleeves.

3. In a machine of the character described, the combination with a pair of index plates, one of said index plates provided with a row of windows for indicating products and the other of said plates provided with two rows of windows for indicating both products and quotients, of means for coupling said index plates, said means including a lever pivoted to one of said plates, a catch carried by said lever and adapted to engage the other of said plates, and a plurality of shafts each having a prismatic portion, a feed wheel adjustably mounted on the prismatic portion of each of said shafts, a disk loosely carried by each of said shafts, and means for operatively connecting each of said disks with the corresponding shaft, said means comprising a pawl and ratchet.

4. In a machine of the character described, the combination with a pair of index plates, one of said index plates provided with a row of windows for indicating products and the other of said plates provided with two rows of windows for indicating both products and quotients, of means for coupling said index plates, said means including a lever pivoted to one of said plates, a catch carried by said lever and adapted to engage the other of said plates, and reversing mechanism comprising a shaft, gears slidably mounted on said shaft, two parallel bars, one arranged adjacent each of said gears, a lever, and links connecting said lever and bars.

5. In a machine of the character described, the combination with a setting plate provided with a slot and a series of triangular shaped notches adjacent said slot, of a setting slide movable in said slot, an elastic plate carried by said slide, a pair of rollers carried by said elastic plate and adapted to enter said notches, and rollers carried by said setting slide and adapted to run on said setting plate on the side opposite said notches.

6. In a machine of the character described, the combination with a setting plate provided with a slot, a series of notches and a window, and a setting slide movable in said slot, of an endless band connected to said slide and provided with numerals adapted to be brought successively opposite said window as said slide is moved, an elastic plate carried by said slide, a pair of rollers carried by said elastic plate and adapted to enter said notches, and rollers carried by said setting slide and adapted to run on said setting plate on the side opposite said notches.

Signed by me at Berlin this 19th day of September 1906.

ROBERT REIN.

Witnesses:
  WOLDEMAR HAUPT,
  HENRY HASPER.